UNITED STATES PATENT OFFICE.

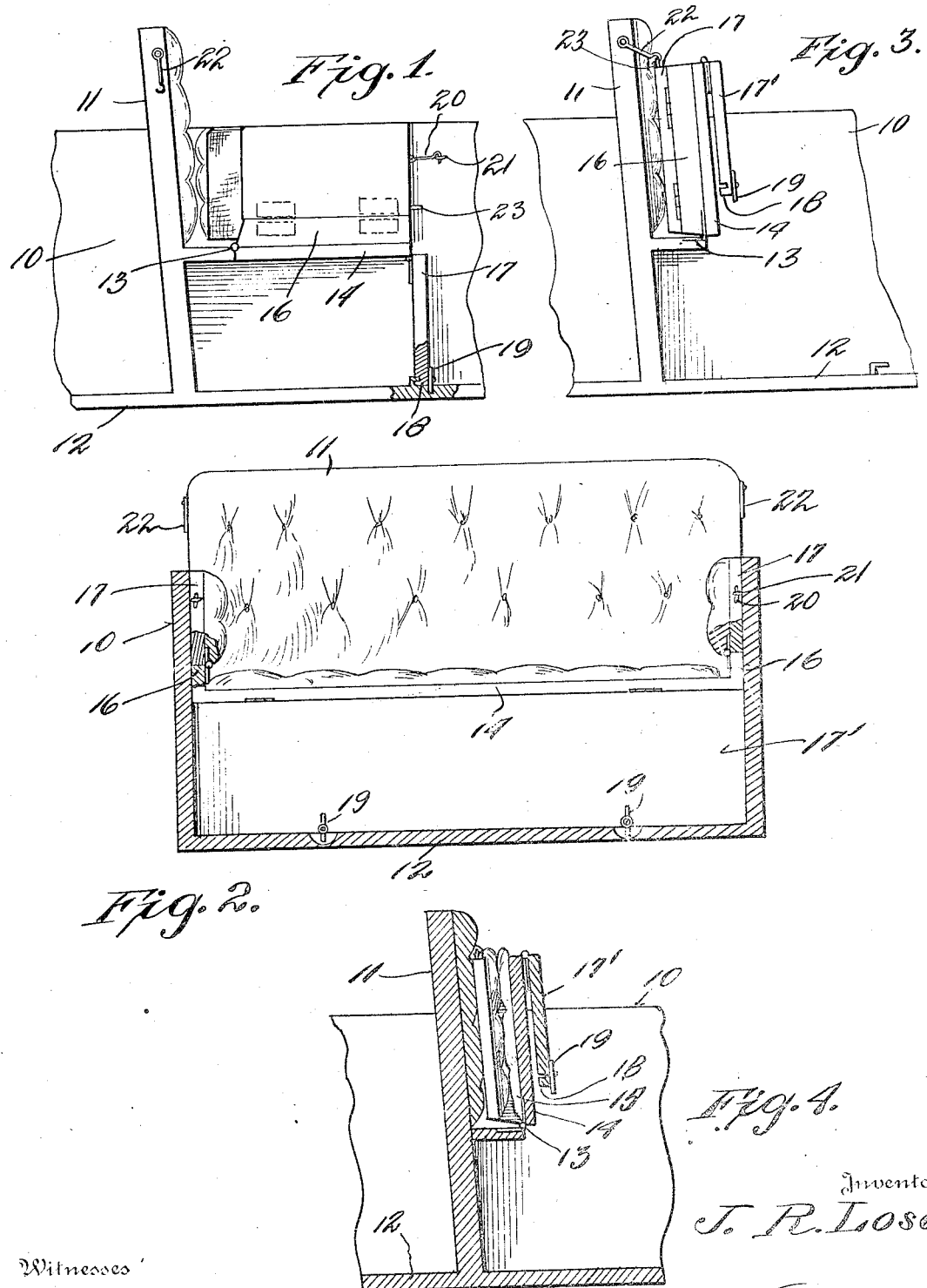

JOHN REUBEN LOSEE, OF NORTHWOOD, IOWA.

VEHICLE-SEAT.

1,115,322.  Specification of Letters Patent.  Patented Oct. 27, 1914.

Application filed March 5, 1914.  Serial No. 822,717.

*To all whom it may concern:*

Be it known that I, JOHN REUBEN LOSEE, a citizen of the United States, residing at Northwood, in the county of Worth, State of Iowa, have invented certain new and useful Improvements in Vehicle-Seats, and I do hereby declare the following to be a full, clear, and exact description of the invention, such as will enable others skilled in the art to which it appertains to make and use the same.

This invention relates to improvements in automobiles, and particularly to seats therefor.

The principal object of the invention is to provide a seat which can be quickly and easily folded up out of operative position to permit of sufficient space to carry various articles.

Another object is to provide a folding seat which forms a part of the vehicle and which will be durable and efficient for the use in seating passengers.

Other objects and advantages will be apparent from the following description, when taken in connection with the accompanying drawings.

In the drawings: Figure 1 is a side elevation of my improved seat in extended position. Fig. 2 is a front elevation of the same. Fig. 3 is a side elevation of the seat in folded position. Fig. 4 is a vertical longitudinal sectional view in the position shown in Fig. 3.

Referring particularly to the accompanying drawings, 10 represents the sides of the automobile body, 11 the back and 12 the floor. Hinged at 13 to the back is a seat board 14 which is tufted as indicated at 15. Each end of the board has a vertical extension 16 to which is hinged a sideboard 17, these boards being also tufted. Hinged to the front edge of the seat board is a depending board 17' which rests on the floor at 12 to support the seat when said seat is in extended position. Suitable latch members 19 are mounted on the lower edge portion of the board 17 which coöperate with keepers 18 on the floor 12 to hold the board in upright position. Carried by the sideboards 17 are hook members 20 for engagement with eyes 21 carried by the sides of the vehicle, these hooks and eyes holding the sideboards in elevated position when the seat is extended. Carried by the upper portion of the back 11 are hook members 22 which coöperate with eye members 23 to support the seat in folded position.

When it is desired to fold the seat, the hooks 20 are disengaged from the eyes 21, and the latches 19 released from the keepers 18. The sideboards 17 will fall inwardly onto the seat board. The seat board is then swung upwardly against the back, and held in this position by the hooks and eyes 22 and 23. When the seat board 14 is swung up, the board 17 will swing downwardly against the bottom of the seat board. Thus the space formerly occupied by the seat can be readily used for various articles which the person desires to carry and which could not well be stowed in the rear of the vehicle with the ordinary vehicles where the seats are immovable.

From the foregoing it will readily be seen that I have provided a novel and simple folding seat for an automobile which can be quickly and easily folded up out of the way to permit of the use of the floor space thus exposed. This seat is particularly adapted for the rear of a two-seat automobile.

What is claimed is:

The combination with the sides and back of an automobile body, of a seat member movably connected to the back, a depending supporting member movably connected to the forward edge of the seat member, side members movably connected to the end portions of the seat member, and movable into position against the said automobile sides, detachably connected means carried by the side members and the automobile sides for holding the side members in vertical position against the automobile sides, means for holding the depending support in vertical position, and means for holding the seat member in folded position against the said back.

In testimony whereof, I affix my signature, in the presence of two witnesses.

JOHN REUBEN LOSEE.

Witnesses:
C. W. FOWLER,
HARRY M. TEST.